(12) United States Patent
Zisapel et al.

(10) Patent No.: US 9,591,011 B2
(45) Date of Patent: *Mar. 7, 2017

(54) TECHNIQUES FOR SEPARATING THE PROCESSING OF CLIENTS' TRAFFIC TO DIFFERENT ZONES IN SOFTWARE DEFINED NETWORKS

(71) Applicant: RADWARE, LTD., Tel Aviv (IL)

(72) Inventors: Yehuda Zisapel, Tel Aviv (IL); Avi Chesla, Tel Aviv (IL); Shay Naeh, Tel Aviv (IL); David Aviv, Tel Aviv (IL); Ehud Doron, Moddiin (IL)

(73) Assignee: RADWARE, LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/957,876

(22) Filed: Dec. 3, 2015

(65) Prior Publication Data
US 2016/0156648 A1   Jun. 2, 2016

Related U.S. Application Data

(63) Continuation of application No. 13/744,074, filed on Jan. 17, 2013, now Pat. No. 9,210,180.
(Continued)

(51) Int. Cl.
*G06F 11/00* (2006.01)
*G06F 12/14* (2006.01)
(Continued)

(52) U.S. Cl.
CPC ...... *H04L 63/1416* (2013.01); *H04L 63/1408* (2013.01); *H04L 63/1441* (2013.01)

(58) Field of Classification Search
None
See application file for complete search history.

(56) References Cited

U.S. PATENT DOCUMENTS 7,272,115 B2   9/2007   Maher et al.
7,530,106 B1   5/2009   Zaitsev et al.
(Continued)

OTHER PUBLICATIONS

Davis, Brough, "Leveraging the Load Balancer to Fight DDoS", The SANS Institute, InfoSec Reading Room, Dec. 13, 2009, Copyright 2010.
(Continued)

*Primary Examiner* — Michael R Vaughan
*Assistant Examiner* — Vadim Savenkov
(74) *Attorney, Agent, or Firm* — M&B IP Analysts, LLC

(57) ABSTRACT

A central controller and a method for separation of traffic processing in a software defined network (SDN). The method comprises: identifying, based on at least one zoning trigger parameter, a potential cyber-attack; triggering a zoning mode for mitigating the potential cyber-attack; dynamically allocating, based on a load profile, a first group of computing resources of a computing farm to a trusted zone and a second group of computing resources to an un-trusted zone; assigning the computing resources in the first group with a first address and the computing resources in the second group with a second address, wherein only the second address is advertised; and causing at least one network element in the SDN to divert incoming traffic to the first group and to the second group of computing resources based on a plurality of zoning rules implemented by the at least one network element.

19 Claims, 6 Drawing Sheets

Related U.S. Application Data

(60) Provisional application No. 61/625,872, filed on Apr. 18, 2012.

(51) Int. Cl.
  *G06F 12/16* (2006.01)
  *G08B 23/00* (2006.01)
  *H04L 29/06* (2006.01)

(56) References Cited

U.S. PATENT DOCUMENTS

| | | | |
|---|---|---|---|
| 7,733,891 | B2 | 6/2010 | Reynolds et al. |
| 7,882,556 | B2 | 2/2011 | Ahn et al. |
| 8,051,481 | B2 | 11/2011 | Baldonado et al. |
| 8,225,400 | B2 | 7/2012 | Pacella et al. |
| 8,503,307 | B2 | 8/2013 | Tourrilhes et al. |
| 8,751,627 | B2 | 6/2014 | Liu et al. |
| 2009/0161541 | A1 | 6/2009 | Harhira et al. |
| 2010/0332617 | A1 | 12/2010 | Goodwin et al. |
| 2011/0083179 | A1 | 4/2011 | Lawson et al. |
| 2013/0003735 | A1 | 1/2013 | Chao et al. |
| 2013/0044758 | A1 | 2/2013 | Nguyen et al. |
| 2013/0054817 | A1 | 2/2013 | Moen et al. |
| 2013/0070762 | A1 | 3/2013 | Adams et al. |
| 2013/0097304 | A1* | 4/2013 | Asthana .............. H04L 41/5025 709/224 |
| 2013/0111467 | A1 | 5/2013 | Sundararaj |
| 2013/0263256 | A1 | 10/2013 | Dickinson et al. |
| 2013/0272305 | A1 | 10/2013 | Lefebvre et al. |

OTHER PUBLICATIONS

Latanicki, Joseph, et al, "Scalable Cloud Defenses for Detection, Analysis and Mitigation of DDoS Attacks", Towards the Future Internet, IOS Press, 2010, pp. 127-137, Copyright 2010 The Authors and IOS Press.

* cited by examiner

TECHNIQUES FOR SEPARATING THE PROCESSING OF CLIENTS' TRAFFIC TO DIFFERENT ZONES IN SOFTWARE DEFINED NETWORKS

CROSS-REFERENCE TO RELATED APPLICATIONS

This application is a continuation of U.S. patent application Ser. No. 13/744,074 filed on Jan. 17, 2013, now allowed, which claims the benefit of U.S. Provisional Application No. 61/625,872 filed on Apr. 18, 2012, the contents of which are herein incorporated by reference.

TECHNICAL FIELD

This invention generally relates to software defined networks (SDNs), and particularly to techniques for guaranteeing continuous services by computing resources connected to software defined networks.

BACKGROUND

A software defined network (SDN) is a relatively new type of networking architecture that provides centralized control of network elements rather than a distributed architecture utilized by conventional networks. That is, in a distributed architecture each network element makes a routing decision based on the results of traffic processing and a distributed control mechanism. In contrast, in the SDN, a network element follows routing decisions received from a central controller. In detail, the operation of a network element can be logically divided into a "control path" and a "data path". In the control path, control protocols, e.g., for building in routing protocols, a spanning tree, and so on, are operable. In the data path, packets-processing operations are performed. Such operations include examining each input packet and making decisions based on the examination as to how to handle the input packet (e.g., packet forwarding, packet switching, bridging, load balancing, and so on). Furthermore, in a conventional network, network elements typically include both a control plane and a data plane, whereas in a SDN, the network elements include the data path, and the central controller implements the control path.

The SDN can be implemented in wide area networks (WANs), local area networks (LANs), the Internet, metropolitan area networks (MANs), ISP backbones, datacenters, and the like. Each network element in the SDN may be a router, a switch, a bridge, a load balancer, and so on, as well as any virtual instantiations thereof.

In one configuration of a SDN, the central controller communicates with the network elements using an OpenFlow protocol which provides a network abstraction layer for such communication. Specifically, the OpenFlow protocol allows adding programmability to network elements for the purpose of packets-processing operations under the control of the central controller, thereby allowing the central controller to define the traffic handling decisions in the network element.

Traffic received by a network element that supports the OpenFlow is processed and routed according to a set of rules defined by the central controller based on the characteristic of the required network operation. Such a network element routes traffic according to a flow table and occasionally sends packets to the central controller. Each network element is preconfigured with a flow table and can be modified by the central controller as required. The operation of network elements according to the OpenFlow protocol is further described in the "OpenFlow Switch Specification", Version 1.1.3, published on Apr. 16, 2012 by Open Networking Foundation, the contents of which are hereby incorporated by reference merely for the useful understanding of the background.

Thus, the OpenFlow protocol and SDN allow utilizing the hardware speed processing capability of conventional network elements while providing more flexibility in the traffic packet-processing decisions. As noted above, packets-processing operations include, but are not limited to, routing, load balancing, forwarding, switching, and bridging of packets. While the OpenFlow protocol allows the programmability of network elements in the SDN, this protocol does not define how this capability can be utilized to efficiently provide value added services including, but not limited to, security services to users of the SDN.

A significant problem facing the Internet community is that on-line businesses and organizations are vulnerable to malicious attacks. Recently, attacks have been committed using a wide arsenal of attack techniques and tools targeting both the information maintained by the on-line businesses and their IT infrastructure. Hackers and attackers are constantly trying to improve their attacks to cause irrecoverable damage, overcome currently deployed protection mechanisms, and so on.

Attacks and attack attempts are executed against servers and clients at different layers (e.g., a network layer and an application layer). Attacks have become more sophisticated and their scope has also been increased. That is, a multitude number of infected machines and groups of organized attackers take part in coordinated attack campaigns. Thus, it has become a significant challenge to secure online businesses and organizations against targeted attack campaigns.

As a result, organizations and businesses lose revenue due to security-related downtime, information theft, and the compromise of confidential information. Consequently, the organizations and businesses suffer immeasurable damage to their brand and image. In many cases, even after the attack has stopped, the remediation process can be a long and expensive process. That is, it may take a long time to restore the services/applications provided by the attacked site back to functioning properly.

Currently available security systems cannot guarantee full protection against a vast number of cyber threat categories and the numerous number of attack vectors that exist to execute such threats. As a result, when a site or a data center is under attack, a portion of the site or the entire site may be idle, and legitimate clients cannot access the servers of the site, or they experience a very low service response (high latency). Examples for cyber-attacks include denial-of-service (DoS), intrusion type of attacks, buffer overflow attacks, misuse of computing resources, and the like. Types of (web directed) attacks include, for example, web defacement attacks, cross site scripting attacks, and more.

Although there are various security systems designed to detect, mitigate, and prevent cyber-attacks, there is no security system that can fully guarantee that such attacks will not succeed in negatively impacting the sites' services, and that clients of the site will not be affected. Thus, when a site is under attack, there is always a chance that the Quality of Service (QoS) is compromised and the service-level agreement (SLA) cannot be guaranteed to the site's users.

It would therefore be advantageous to provide an efficient solution that would ensure continuous services and guarantee the SLA for legitimate and trusted clients even when the site is under attack.

SUMMARY

Certain embodiments disclosed herein include a method for separation of traffic processing in a software defined network (SDN). The method comprises identifying, based on at least one zoning trigger parameter, a potential cyber-attack; upon identifying the potential cyber-attack, triggering a zoning mode for mitigating the potential cyber-attack; upon triggering the zoning mode, dynamically allocating, based on a load profile, a first group of computing resources of a computing farm to a trusted zone and a second group of computing resources to an un-trusted zone; assigning the computing resources in the first group with a first address and the computing resources in the second group with a second address, wherein only the second address is advertised; and causing at least one network element in the SDN to divert incoming traffic to the first group and to the second group of computing resources based on a plurality of zoning rules implemented by the at least one network element, wherein the plurality of zoning rules are determined by the central controller and determine that the traffic from a known trusted client is directed to the first group of computing resources and the traffic from an un-trusted client is directed to the second group of computing resources, thereby providing guaranteed service-level agreement to trusted clients.

Certain embodiments disclosed herein also include a central controller for a software defined network (SDN). The central controller comprises: a processing unit; and a memory, the memory containing instructions that, when executed by the processing unit, configures the central controller to: identify, based on at least one zoning trigger parameter, a potential cyber-attack; upon identifying the potential cyber-attack, trigger a zoning mode for mitigating the potential cyber-attack; upon triggering the zoning mode, dynamically allocate, based on a load profile, a first group of computing resources of a computing farm to a trusted zone and a second group of computing resources to an un-trusted zone; assign the computing resources in the first group with a first address and the computing resources in the second group with a second address, wherein only the second address is advertised; and cause at least one network element in the SDN to divert incoming traffic to the first group and to the second group of computing resources based on a plurality of zoning rules implemented by the at least one network element, wherein the plurality of zoning rules are determined by the central controller and determine that the traffic from a known trusted client is directed to the first group of computing resources and the traffic from an un-trusted client is directed to the second group of computing resources, thereby providing guaranteed service-level agreement to trusted clients.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1A:
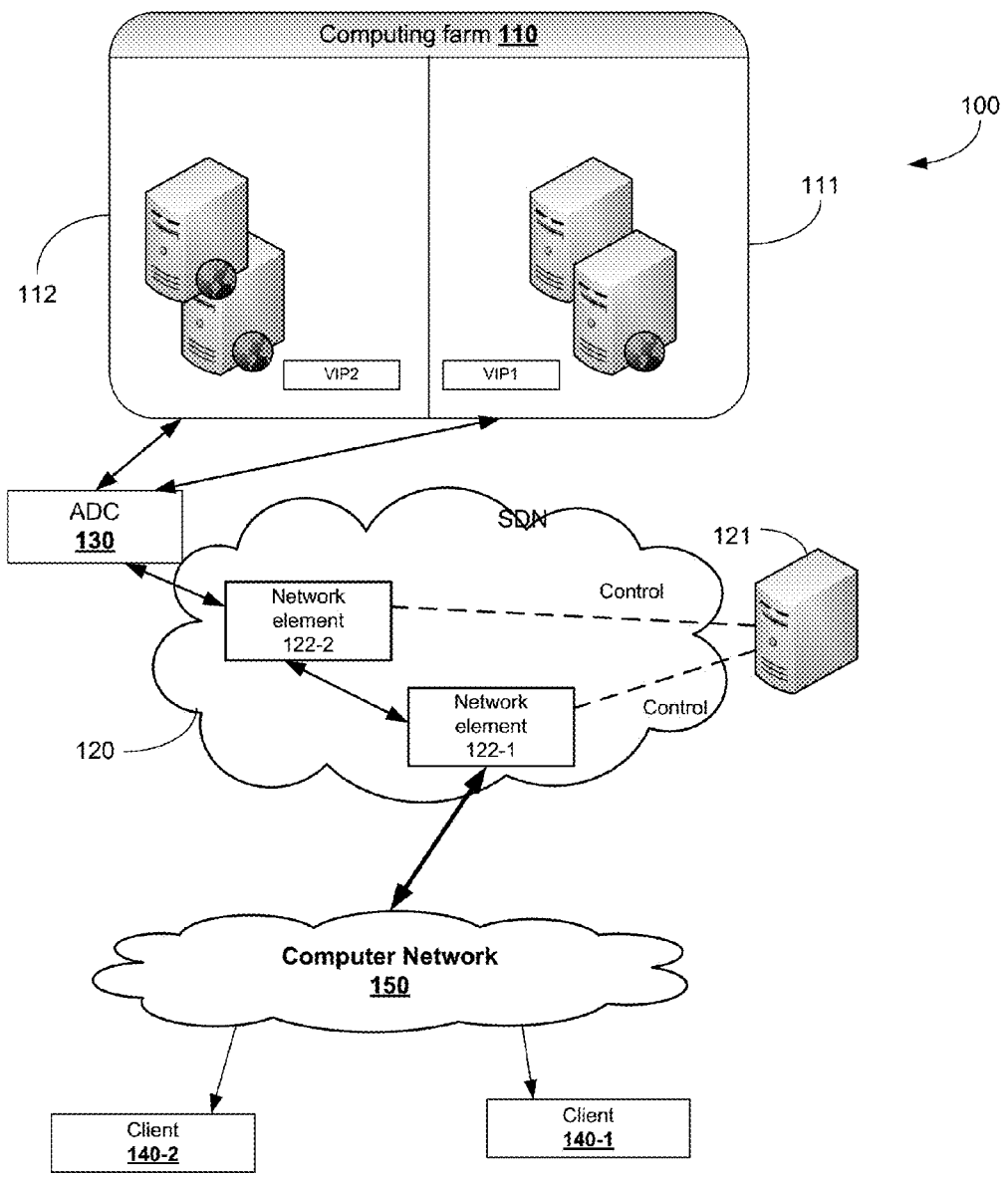
FIGS. 1A and 1B illustrates a network system utilized to describe the separated processing of trusted and un-trusted traffic according to various embodiments.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain embodiments disclosed herein allow distinguishing between trusted and un-trusted clients accessing a site. An un-trusted client can be an anonymous client whose history, legitimacy, reputation, and/or identity is unknown. There is a higher probability that an un-trusted client will perform attack activities against the site. A trusted client is a client whose identity and/or reputation is known as legitimate in all regards as to utilization of the services provided by the site. A site includes a plurality of servers that provide services to the clients. The site may be part of a global computing (server) farm located in distributed geographical locations, a local server farm, or a combination thereof.

According to the embodiments disclosed herein, a determination is made if a computing farm should operate in a zoning mode. This may occur during a cyber-attack or a period of time when the site is considered to be under high risk to be a target of a cyber-attack. This can be any type of known and unknown attack including, for example, DoS, DDoS, intrusion attack, web defacement, cross site scripting, buffer overflow, misuse of computing resources, and the like.

In the zoning mode, the computing resources of the farm are dynamically allocated and separated to a trusted and an un-trusted zone. The computing resources in the trusted zone are selected to ensure high SLA to trusted clients based, in part, on pre-defined and/or previously learned service usage characteristics.

Traffic from trusted clients is routed to the trusted zone, for processing therein. Traffic from un-trusted clients is not processed in the trusted zone, thus enabling a delivery of a higher security SLA, availability, and better user experience to trusted clients. To this end, traffic from all clients is continuously monitored, and based on a plurality of parameters described in detail below, it is determined if a client is trusted or un-trusted. In addition, a plurality of parameters is evaluated to determine if the site should be switched to a zoning mode.

FIG. 1A shows an exemplary diagram of a network system 100 utilized to describe the various embodiments disclosed herein. The network system 100 includes a computing (server) farm 110 that includes two sites 111 and 112 connected to a software defined network (SDN) 120 through an ADC 130. Clients 140-1 and 140-2 communicate with servers in the farm 110 through a computer network 150 and the SDN 120. The ADC 130 typically distributes clients' traffic between the servers in a server farm to balance the load. The ADC traffic distribution rules are typically based on the availability of the servers (health), the load on the servers, and other parameters such as the application persistency rules, global load balancing, and so on. The ADC 130 may be a physical device that executes virtual instances of ADCs. Each such virtual instance can be addressed by a MAC address, a port number, a VLAN ID, an IP address, or any combination therefore. An example for an ADC that executes virtual instances of ADCs can be found in a co-pending U.S. application Ser. No. 13/405,816 titled "TECHNIQUES FOR VIRTUALIZATION OF APPLICATION DELIVERY CONTROLLERS" assigned to the common assigned and incorporated herein by reference. The computer network 150 may be a WAN, the Internet, a LAN, or a combination thereof. In certain deployments, one or more clients 140 may be connected only to the SDN 120.

For the sake of simplicity, only two sites 111 and 112, and two clients 140-1 and 140-2 are shown in FIG. 1A. However, the embodiments disclosed herein can be applied to any number of clients and sites. The clients may be located in different geographical locations. The sites may be a datacenter, a server farm, or combinations thereof. According to one embodiment, each of sites 111 and 112 is designed to deliver the SLA including a security SLA guaranteed to each of the clients 140-1 and 140-2. Without limiting the scope of the disclosed embodiments, the site 111 is configured to be in an un-trusted zone whereas the site 112 is defined as a trusted zone.

As shown in FIG. 1A, each of the sites 111 and 112 includes a plurality of servers. The computing farm 110 may be a global server farm in which the sites 111 and 112 are geographically distributed, or a local server farm where all the servers reside in one center. According to one embodiment, each of the sites 111 and 112 is assigned with a different virtual IP (VIP) address. For example, sites 111 and 112 are assigned with VIP1 and VIP2 respectively. As will be discussed in greater detail below, one of the sites, e.g., site 111 is configured to handle traffic from un-trusted clients while site 112 processes traffic from trusted clients. With this aim, only the VIP of the site in the un-trusted zone (e.g., site 111 and its VIP1) is advertised. That is, a DNS request from one of the clients 140 for an IP address of servers in the farm 110, returns the VIP of the site 111, e.g., VIP1.

The SDN 120 includes a central controller 121 and a plurality of network elements 122. As noted above, a SDN can be implemented in wide WANs, LANs, the Internet, MANs, ISP backbones, datacenters, and the like. The central controller 121 defines a set of a rules for the network elements 122 such as how to process the traffic between the farm 110 and the clients 140. Each network element 122 in one exemplary configuration is a switch that implements SDN-based provisions protocols, e.g., the OpenFlow protocol, and communicates by means of this protocol with the controller 121. In the exemplary deployment illustrated in FIG. 1A, two network elements 122-1 and 122-2 are shown. The network element 122-1 is connected at the edge of the SDN 120 and receives traffic from the clients 140. The network element 122-2 is connected at the other edge of the SDN 120 and communicates with the ADC 130. It should be noted that the SDN 120 may include any number of network elements, each of which communicates with the central controller 121.

It should be noted that the SDN 120 may include a plurality of central controllers, each of which controls a group of network elements and can communicate with different ADCs locally or geographically connected to different sites. In addition, the plurality of central controllers may communicate with each other. In such embodiment, each group of sites can be in a trusted zone, and a different group of sites can be located in an un-trusted zone.

According to various embodiments disclosed herein, the central controller 121 performs a zoning process. The zoning process includes determining a list of trusted clients and a set of rules (hereinafter "zoning rules") such as how to handle traffic received from trusted clients. The zoning process ensures that the trusted clients receive the guaranteed SLA and uninterrupted services.

The central controller 121 is configured with and continuously receives (e.g., through APIs), security risk indication parameters. Based on these parameters, the controller 121 computes a threat level value for each of the clients 140. This value allows determining if a client is trusted or un-trusted.

The security risk indication parameters include at least one of: a pre-compiled list of trusted clients per IP address, a reputation scores per IP address or geographical region, application layer parameters (e.g., clients' cookies), a client unique identification (ID) token, an affiliation of a client (e.g., a client belongs to a trusted company or is an internal client of the organization), parameters collected from external and internal client authentication services (e.g., Radius servers, LDAP servers, "call-back" procedure, etc.), geo analysis (e.g., the origin of a client's traffic in comparison to other clients), a type of content and/or application accessed by the client, behavioral analysis (e.g., comparing the clients' behavior to a normal behavior of the client), and so on.

The central controller 121 further receives (e.g., through APIs) one or more zoning trigger parameters that provide an indication as to whether the controller 121 should switch to a zoning mode. That is, a zoning trigger parameter can indicate a potential risk that an attack is about to take place against the computing farm 110 or that the farm 110 is currently under attack. In one embodiment, once the zoning mode is triggered, the central controller 121 can convey the rules to one or more of the network elements 122-1, 122-2.

The zone trigger parameter(s) can be received from any other external source, such as a network security manager, a security engine, reputation services servers, or media outlets (e.g., if the site name is mentioned in online media as being a target of cyber-attack groups). The zone trigger parameter may be also a predefined rule, based upon which the central controller decides whether or not to switch to the zoning mode. For example, such a rule may be a predefined time window (e.g., a certain date, time in a day, or day in a week), geographical-location of the source traffic, a predefined pattern of content in the incoming traffic, or traffic directed to a certain service (e.g., traffic to a finance application). In another embodiment, zoning trigger parameters having predefined rules may be configured in a proactive policy saved in the controller 121.

In one embodiment, one or more proactive policies can be implemented in situations where there is a high risk condition for an attack, even before such an attack occurs. For example, activation of the trusted and un-trusted zones when a warning about a possible attack has been raised, or in a certain hour in a day, or during a holiday vacation when most of the information technology (IT) team is not present at the site, or in response to a specific event to which attackers may react in attacking the site. In another embodiment, the zone trigger parameter may be an external trigger from a user (e.g., a system administrator or a network security manager), and so on. In yet another embodiment, the switching to zoning mode is based on one or more proactive policies and zoning trigger parameters defined therein.

When switching to the zoning mode, traffic from the one or more trusted clients should be diverted to the site 112 in the trusted zone. As will be discussed below, the diversion of traffic to the site 112 is achieved by the set of zoning rules created by the central controller 112 and executed in accordance with rules administered by the one or more of the network elements 122-1, 122-2.

As mentioned above, a threat level value is computed for each client based on one or more of the security risk indication parameters. This value may be a binary value, a color-coded value (e.g., red, green and yellow), or any numerical value that can be utilized to determine if the client should be treated as a trusted or un-trusted client. The computation of the threat level value may be based on a score assigned to each parameter and the level may be determined based on the scores of the parameters applicable for the client. This allows providing a certain weight to certain parameters. The computation of the threat level value may be, for example, an average or weight average of the scores. A computed threat level value may be compared to a predefined threshold to determine if the client is a trusted client. The threat level may be set to a value indicating that the client should be labeled as trusted based on a single predefined parameter. For example, if the client's IP is in a pre-compiled list of trusted IP addresses, then the value may be set to indicate that the client should be labeled as trusted.

A zoning rule defines for each trusted client the action that should be taken, i.e., whether the traffic should be diverted to the site 112 and how the diversion should be performed. Specifically, the action defines that a destination IP address in each packet received from a trusted client should be changed to the VIP address of the site 112 in the trusted zone. Another action requires that for any packet received from the site 112 with a destination IP address of a trusted client, the source IP address should be changed to the address of the site 111 in the un-trusted zone (e.g., VIP1). As noted above, only the VIP1 of the site 112 is advertised. Another zoning rule defines that all packets received from the clients 140 with a destination IP address of the site 112 (e.g., VIP2) should be dropped, because such traffic is suspicious (as VIP2 is not a known address).

The set of zoning rules is conveyed to one or more of the network elements 122-1 and 122-2 which execute these rules on each packet received from the clients 140 and the ADC 130. It should be noted that each network element can perform all of the zoning rules or part of the zoning rules. For example, the network element 122-1 may implement the rules that require changing the IP destination address and the dropping of suspicious packets, while the network element 122-2 can perform the action that requires changing the source IP address. Again, the SDN 120 may include a single network element that would perform and implement all the zoning rules.

Following is a non-limiting example for the process of separating traffic processing to sites in different zones. In the following example, it is assumed that client 140-1 is a trusted client. Primarily, traffic from clients 140-1 and 140-2 is directed to the site 111. The destination IP address of packets originated at the clients 140-1 and 140-2 is VIP1. In the zoning mode, the zoning rules are sent to the network elements 122 which process the traffic, in part, according to these rules. Specifically, traffic from client 140-2 received at the network element 122-1 is sent to the original destination, i.e., site 111. Traffic from the trusted client 140-1 is diverted to the site 112 in the trusted zone. With this aim, the destination address of packets received from the client 140-1 is changed to indicate the IP address of site 112, e.g., VIP2. To maintain compliance in the responses received from the servers in the site 112, the source address of packets received from the site 112, is changed to indicate the original IP address, e.g., VIP1. As noted above, modifying the address fields in the packets sent from or to the trusted client 140-1 is performed by any of the network elements 122.

It should be noted that the ADC 130 can balance the traffic between the sites 111 and 112 when operating in a "normal" mode of operation and during the zoning mode. The load balancing can be performed based on global load balancing criteria. Such criteria include, but are not limited to, proximity between a client and site, latency, cost, and so on.

Because the site 112 in the trusted node processes only traffic that originates in trusted clients, the SLA can be guaranteed to such clients as the site 112 will be less likely impacted by an ongoing attack. The site 111 in the un-trusted zone can process the traffic to mitigate any attack executed by un-trusted clients (e.g., client 140-2). The site 111 may also collect information about the behavior of the un-trusted clients in order to learn the type of the attack being performed in case an attack is really executed. Such forensics information can be shared with a security organization (SOC) and/or utilized to develop counter attacks or new mitigation techniques.

In one embodiment, the site 112 is a replica of the site 111 (i.e., includes the same computing resources and service content as in the site 111) which has been designed to efficiently support all clients (trusted and un-trusted) that access the computing farm 110. Thus, the site 112 in the trusted zone can efficiently support and provide the guaranteed SLA to a subset of clients (only trusted clients). In another embodiment, only a set of servers in the site 112 can be pre-allocated to process traffic of trusted clients diverted by network elements 122, when additional servers may be added ah-hoc based on the volume of traffic.

According to another embodiment, a set of servers in each of the sites 111 and 112 may be configured as a trusted zone while the other servers are in the un-trusted zone. The traffic from the trusted clients will be diverted to the servers in the "trusted zone" in either of the sites. Traffic from trusted clients can be load-balanced among the servers allocated to the trusted zone in the sites 111 and 112 based, in part, on global load balancing criteria.

Figure 1B:
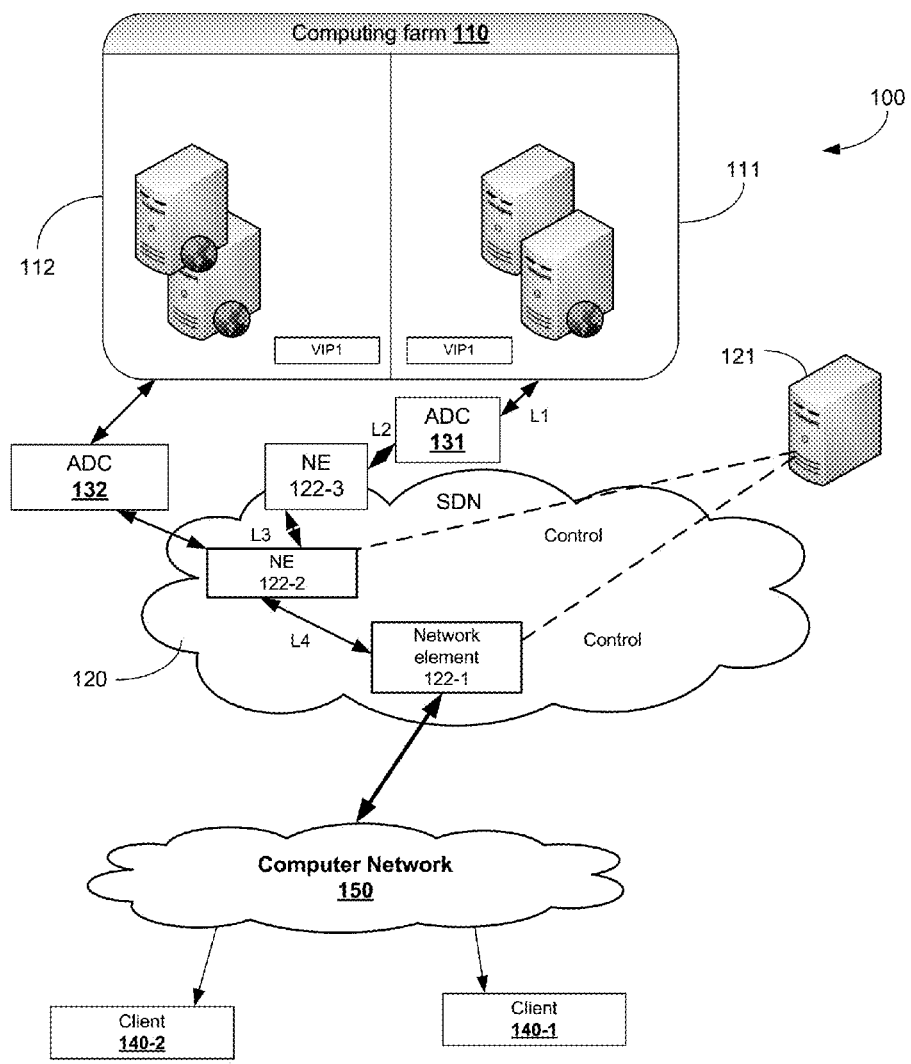

FIG. 1B shows a different configuration of the network system 100 in which the separation of traffic processing is achieved according to another embodiment. In this embodiment, at least one ADC is connected to each site in the computing farm. In the exemplary FIG. 1B, ADCs 131 and 132 are connected respectively to sites 111 and 112. As noted above, the site 111 is configured to be in an un-trusted zone whereas the site 112 is defined as a trusted zone. Thus, the ADC 131 serves traffic from un-trusted clients and ADC 132 serves traffic from trusted client. According to this embodiment, traffic to both sites 111 and 112 is addressed to the same IP address, e.g., VIP1, where the central controller 101 instructs the edge network element 122-2 to which of the ADCs 131, 132 to send the traffic received from the clients 140-1 and 140-2. That is, under attack the ADC 132 and the site 112 serves trusted clients, while all the traffic generated by un-trusted clients is handled by the ADC 131 and the site 111 operable in an un-trusted zone. As noted above, each of the ADCs 131 and 132 may be a physical device that executes virtual instances of ADCs.

To this end, once a list of trusted clients is determined by the controller 101 the zoning rules are created. In this embodiment, a zoning rule may include directing traffic received from a trusted client to the ADC 132. The ADC 132 may be identified by a port number in the element 122-2, a VLAN ID, a MAC address, an IP address, or a combination thereof. It should be noted that the embodiment illustrated in FIG. 4B, provides another level of traffic separation realized by the different ADCs. That is, the traffic separation is not realized through sites in the farm, but also by additional components (ADCs) along the path between clients and servers of the farm. Thus, isolation of computing resources is achieved through separate ADCs per different client types.

In one embodiment, a complete isolation of traffic between trusted and un-trusted clients is achieved. According to this embodiment, the traffic is routed from the trusted client 140-1 to the site 111 through network elements and the ADC 132 which construct a trusted path. With this aim, the controller 110 establishes the trusted path by causing the network elements to route traffic to and from a trusted client through selected network elements and network links in the network. For example, as shown in the exemplary FIG. 1B, a trusted path is established over links L1-L4 and through network elements (NE) 122-1, 122-2 and 122-3. Although not shown in FIG. 1B, the trusted path may also include "standard" network appliances, such as switches, routers, firewall devices, and the like. It should be noted that the routing traffic from trusted clients over trusted paths allow separating the traffic routing of trusted clients from the traffic routing of un-trusted clients.

Figure 2:
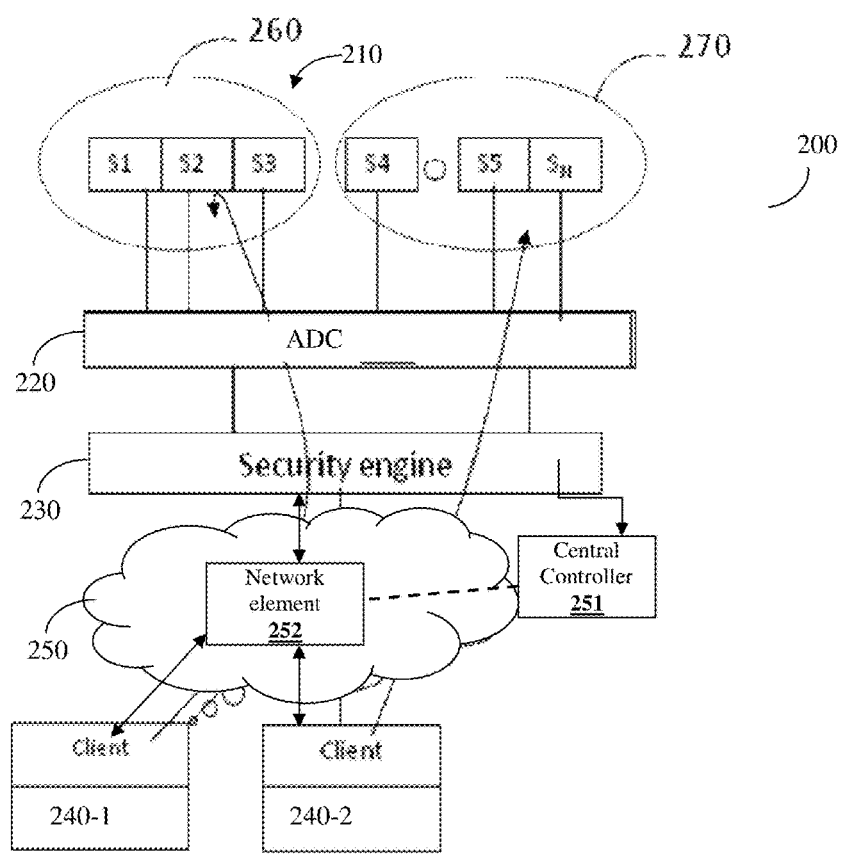
FIG. 2 illustrates a network system utilized to describe the separated processing of trusted and un-trusted traffic according to another embodiment.

FIG. 2 shows an exemplary diagram of a network system 200 utilized to describe another embodiment for performing the zoning process. The system 200 includes a computing farm 210 with a number of N servers $S_1$ through $S_N$ connected to an ADC 220. In one configuration, the ADC 220 is also connected to a security engine 230. The farm 210 provides services to clients 240-1 and 240-2, which communicate with the ADC 220, in part, through a SDN network 250. The SDN network 250 includes a central controller 251 and at least one network element 252 that implements a SDN defined provisioning protocol, such as the OpenFlow protocol. The connection between the clients 240 and the network element 252 may be facilitated through a computer network discussed in detail above. The computing farm 210 may be a local server farm, a global server farm, a data center, or a combination thereof.

According to this embodiment, the ADC 220 and/or the security engine 230 provides the central controller 251 with a list of trusted clients. This list may include a source IP of each trusted client. In an exemplary embodiment, the ADC 220 and/or security engine 230 performs a process that generates a list of trusted clients.

In another embodiment, the list may also include a user name and/or other unique identifier (e.g., cookie) of the user. Because the ADC 220 can process packets at layer-4 to layer-7 of the OSI model, the trusted clients can be identified by layer-4 to layer-7 parameters, such as user names, cookies, and the like. The controller 251 generates the zoning rules based on these parameters.

The ADC 220 is configured with and continuously receives security risk indication parameters, for example, for the security engine 230. Using these parameters, the ADC 220 computes a threat level value for each client 240, as discussed in detail above. Primarily, traffic from both clients 240-1 and 240-2 is distributed among all the active servers $S_1$ to $S_N$. The traffic is monitored and the client threat level is computed. When switching to a zoning mode (based in part on the zoning trigger parameters described above), a first group of servers is allocated to a trusted zone 260 and a second group of servers is allocated to an un-trusted zone 270. In one embodiment, the ADC 220 is configured with the servers that should be included in each zone. In another embodiment, the ADC 220 selects dynamically and in real-time the servers to be allocated to the trusted zone 260. The selection is performed in such a way that trusted clients will always receive the guaranteed SLA.

Each group of severs in the respective zone is assigned with a different virtual IP (VIP) address. For example, servers in the zone 270 are assigned with an address VIP 1 while servers in the zone 260 are assigned with the address VIP2. As noted above, only the address of servers in the un-trusted zone 270, e.g., VIP1 is advertised. Accordingly, all clients address their traffic to VIP1 address. The network element 252, based on the zoning rules received from the controller 251, determines if each received packet is being sent to or from a trusted client, and if so, the element 252 applies the respective action defined in the rule. Examples for the zoning rules are provided above.

The network element 252 may determine if a client is a trusted client based on an IP address and/or other unique identifiers (defined above) of the client. As noted earlier, for trusted clients the destination address is replaced with the address of servers in the trusted zone 260, e.g., VIP2. The network element 252 further replaces the source address of response packets received from servers in the trusted zone 260 with the advertised address, e.g., replacing VIP2 with VIP1.

In one embodiment, the allocation of computing resources including, for example, servers and network resources to each zone can be performed based on a learning mechanism and a load profile baseline creation. Specifically, a load profile while in "normal" (not under attack) of the site 200 is computed. The load profile summarizes the typical load characteristics of each trusted client or a group of trusted clients. The load profile may further register the load characteristics of different client groups originating from different locations. The load characteristics are per different times of the day, week, etc. When the site is under attack, the load profile can be used to calculate how to dynamically separate the farm 210, i.e., how many servers to allocate to the trusted zone 260 and how many servers to be assigned to the un-trusted zone 270.

In another embodiment, weights can be assigned to various allocation criteria. For example, there should always be at least five servers in the trusted zone, and per traffic characteristics, more servers are added if specific transactions and/or applications are invoked. In another embodiment, the farm 210 may include a group of dedicated servers that are provisioned and used only at the zoning mode of the site. Thus, when the farm 210 operates in a zoning mode, the capacity of the farm is increased. In another embodiment, each server in the farm 210 is assigned with a SLA number that indicates which group of clients the server can serve. If a server is assigned with a SLA number that correlates to trusted clients, then this server can process only traffic received from trusted clients. These SLA numbers can be dynamically changed. Allocation of servers to the trusted zone may also include assigning a new VIP address to such servers and performing graceful termination of computed sessions executed therein.

As mentioned above, as the servers in the trusted zone 260 processes only traffic that originates from trusted clients, the SLA can be guaranteed to the trusted clients, e.g., client 240-1, as the servers in the trusted zone 260 will be less likely impacted by an attack. In one embodiment, the ADC 210 monitors the resources utilized to process traffic from trusted clients and determines if more resources (i.e., servers) should be allocated to the trusted zone 260 to ensure the SLA to trusted clients.

According to another embodiment, to the local computing farm 210 shown in FIG. 2, at least two ADCs may be connected, each of which is connected to a different group of servers located in the trusted zone 260 and un-trusted zone 270. In this embodiment, only one VIP is utilized to address traffic to the farm 210 where the traffic separation is performed by the central controller 251. To this end, the traffic controller 251 instructs the network element 252, by means of the zoning rules to which of the at least two ADCs traffic from trusted clients should be directed to. For example, each source IP address of a packet received from a client considered to be a trusted client is forwarded to the ADC (not shown in FIG. 2) connected to the trusted zone 260.

It should be noted that the teachings disclosed herein are also applicable to hybrid networks in which a SDN is a sub-network of a conventional network in which its elements cannot be programmed by a central controller. To allow the proper operation of the methods disclosed above in the hybrid network, at least one of the network elements in the diversion path (i.e., from the client to the ADC) should be adapted to allow programmability by the central controller adapted to operate in a SDN-based network.

Figure 3:
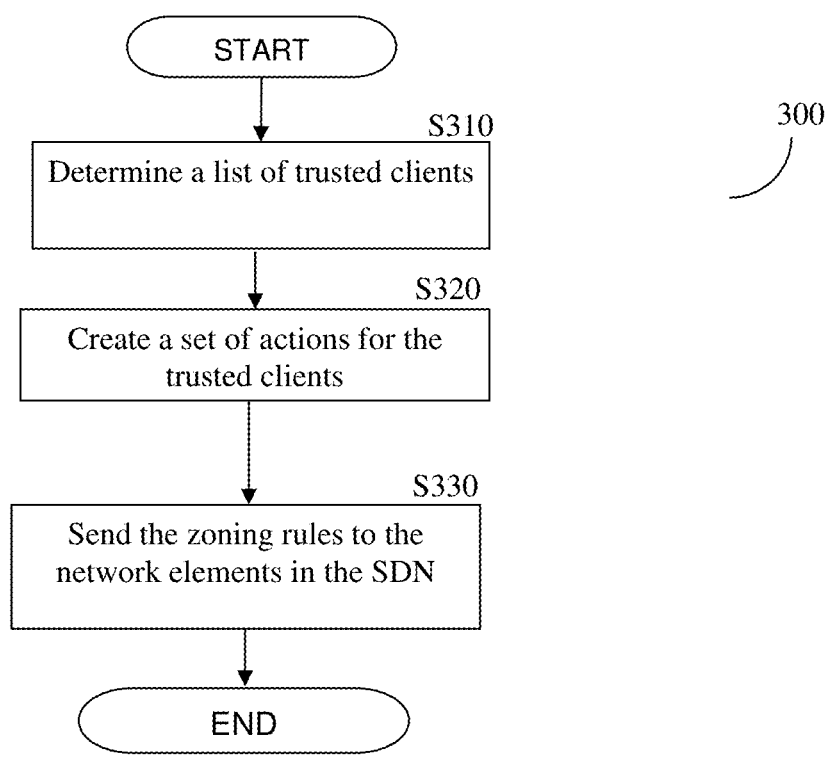
FIG. 3 is a flowchart describing the generating a set of zoning rules according to one embodiment.

FIG. 3 shows an exemplary and non-limiting flowchart 300 illustrating a method for generating the set of zoning rules according to one embodiment. The method is performed by a central controller deployed and operable in a SDN. At S310, a list of trusted clients that can access resources of a computing farm is determined. The list includes for each trusted client at least its IP address. In another embodiment, each client in the trusted zone can be also identified by an application layer unique identifier, such as a user name, a cookie, and the like. The application layer unique identifier can be in addition to or instead of the IP address of the client. A client is determined to be a trusted client based on the threat level value computed using one or more security risk parameters. Then, the computed threat level value is compared to a predefined threshold related to the computed threat level value to determine if the client is trusted or un-trusted. The security risk parameters and the computation of the threat level value are discussed in detail above. The predefined threshold relates to the computed threat level value or a binary value associated with the threat level value. In another embodiment, the threat level value is color-coded, thus the determination is based on its color (e.g., red is an un-trusted client). For example, if the risk indication parameters include a list of trusted client, then the threat level value for client designated in the list is set '0' indicating a binary value of a trusted client. In one embodiment, the list of trusted clients is received from an external system, for example, an ADC.

At S320, for each trusted client a set of actions is created. The actions define in part how to divert traffic received from trusted clients or sent to such clients. In one embodiment, actions are further defined to handle suspicious traffic. Following are non-limiting examples for actions that are created:

1. Match: IP.SRC_IP in {Trusted List} and from CLIENT
   Action: CHANGE IP.DST_IP to VIP2
2. Match: IP.DST_IP in {T1} and from SERVER through ADC
   Action: CHANGE IP.SRC_IP to VIP1
3. Match: IP. DST_IP==VIP2 and from ANY CLIENT
   Action: DROP The matches are performed against the source and destination IP address fields in the received packets as well as to the interface from where packets are received. In this example, the VIP1 is an advertised IP address of the computing farm and VIP2 is the address of the servers (or site) in the trusted zone.

In the embodiment where each site of group of servers in a trusted and un-trusted zone are connected to a different ADC and the traffic is addressed only to one virtual IP address identifying the farm, the zone rules generated by the controller are defined to direct the traffic to the ADC serving the trusted zone. A non-limiting example for such a rule may be:

Match: IP.SRC_IP in {Trusted List} and from CLIENT
Action: Direct Packet with IP.SOURC_IP to PORT#1

In this example, PORT#1 is connected to the ADC serving the trusted zone. As noted above, the ADC can be identified by a VLAN ID, a port number, a MAC address, an IP address, or combination thereof.

At S330, the set of zoning rules are sent to one or more network elements in the SDN together with an instruction to execute these rules on incoming traffic. It should be noted that different zoning rules can be sent to and executed by different network elements. In one embodiment, the rules are sent to the various network elements only when switching to the zoning mode. It should be noted that when not operating in the switching node, the network elements route traffic according to the standard routing configuration and the ADC load balances the traffic according its standard load balancing schema. As noted above, the controller decides to switch to a zoning mode based on one or more of the zoning trigger parameters.

Figure 4:
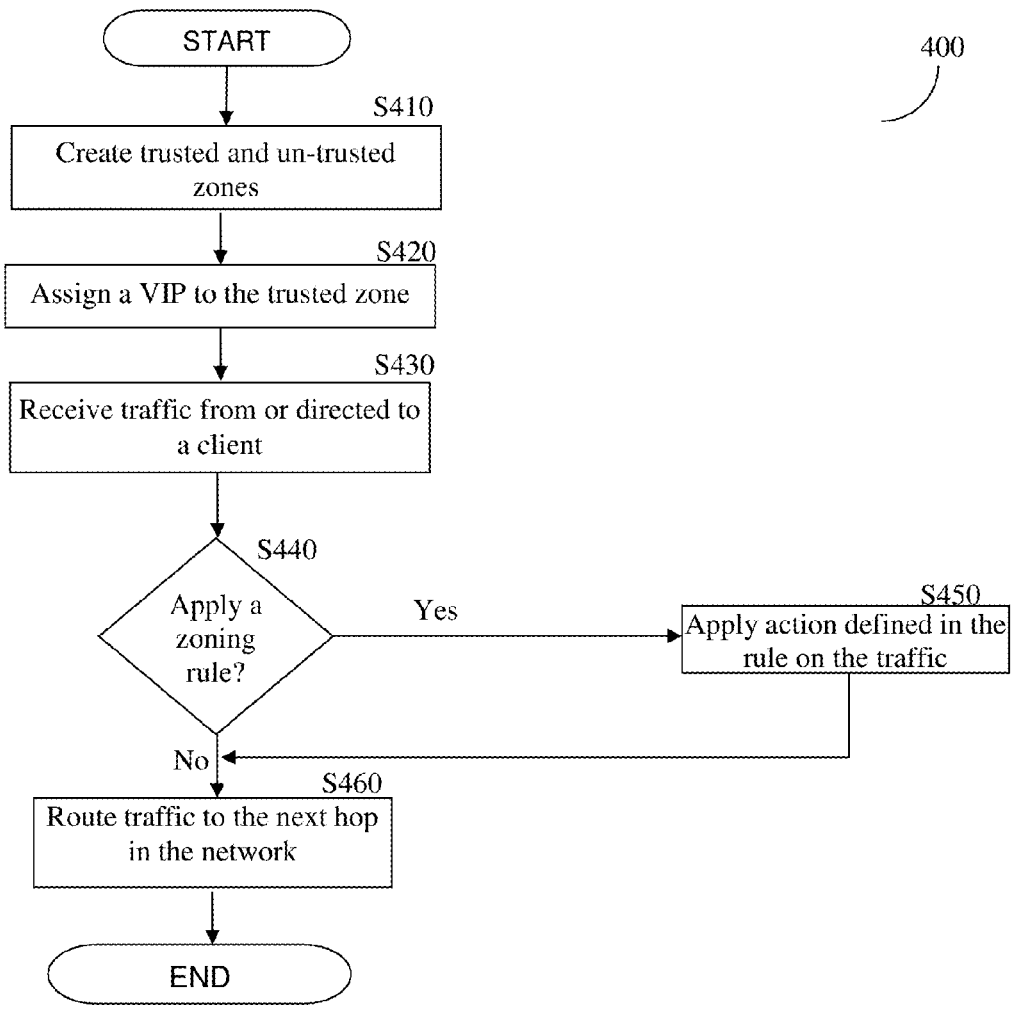
FIG. 4 is a flowchart describing a method for separating the processing of trusted and un-trusted traffic according to one embodiment.

FIG. 4 shows an exemplary and non-limiting flowchart 400 illustrating the method for separating the processing of traffic received from clients according to one embodiment. The method is performed when it is determined, based on one or more zoning trigger parameters, that the computing farm should be switched to a zoning mode.

At S410, trusted and un-trusted zones are created by allocating servers of the computing farm to each zone. Various embodiments for allocating sufficient resources to each zone are discussed above. Optionally, at S420, servers allocated to the trusted zone are assigned with an address, e.g., a VIP address different than the servers in the un-trusted zone. As mentioned above, when multiple ADCs are utilized to separate traffic to different zones that computing farm could be addressed through a single address, thus S420 is optional.

At S430, a packet is received at a network element of a SDN. The packet can be received from a client or an ADC connected to the computing farm. At S440, it is checked, by the network element, if at least one of the zoning rules should be applied on the received packet. According to certain embodiments, S440 includes at least one of: matching a source IP address of packets received from clients against addresses in the trusted list; matching the source IP address of packets received from the ADC against the address assigned to servers in the trusted zones; and matching a destination IP address of packets received from clients against the address of servers in the trusted zone. If S440 results with a Yes answer execution continues with S450;

otherwise, execution proceeds to S460 where the packets are routed to the next hop in the network based in part on the source and destination IP addresses designed in the packets.

At S450, an action defined in each rule that should be applied on the received packet is performed. According to certain embodiments, S450 includes changing the destination IP address of packets received from the clients to VIP2 (the address of servers in the trusted zones) if the source IP address of packets matches an address mentioned in the trusted list; changing the destination IP address of packets received from the ADC to include the address VIP1 (the advertised address) if the source IP address of the received packets matches the address assigned to servers in the trusted zones; dropping packets received from the clients having the same destination IP address as the address of servers in the trusted zones (e.g., VIP2); and forwarding traffic to one of the ADCs serving the trusted zone. Thereafter, execution continues with S460.

The traffic diversion performed by the network elements based on the zoning rules created by the central controller ensures that traffic from trusted clients is always forwarded to servers in the trusted zone, while traffic from un-trusted clients is forwarded to servers in the un-trusted zone. As mentioned above, additional servers may be added to the trusted zone, as need, to ensure high SLA and performance to trusted clients. In an embodiment, the classification of clients as trusted and un-trusted can also be performed when the farm (or site) does not operate in the zoning mode.

It should be noted that the method disclosed hereinabove provides a simple mechanism to divert traffic to and from trusted clients to sites or datacenters that can guarantee continuous services and high SLA, and aims to solve at least the complexity associated with the conventional solutions for diverting in the network. The diverted traffic may be for protocols that allow redirection of traffic in the application layer (e.g., HTTP, SIP, etc.) and protocols that do not allow redirection (e.g., SMTP, UDP, etc.). It should be further noted that the embodiments disclosed herein allow processing of traffic from all clients that access the farm, regardless of being trusted and un-trusted, thus there is no false positive related to blocking of legitimate traffic.

Figure 5:
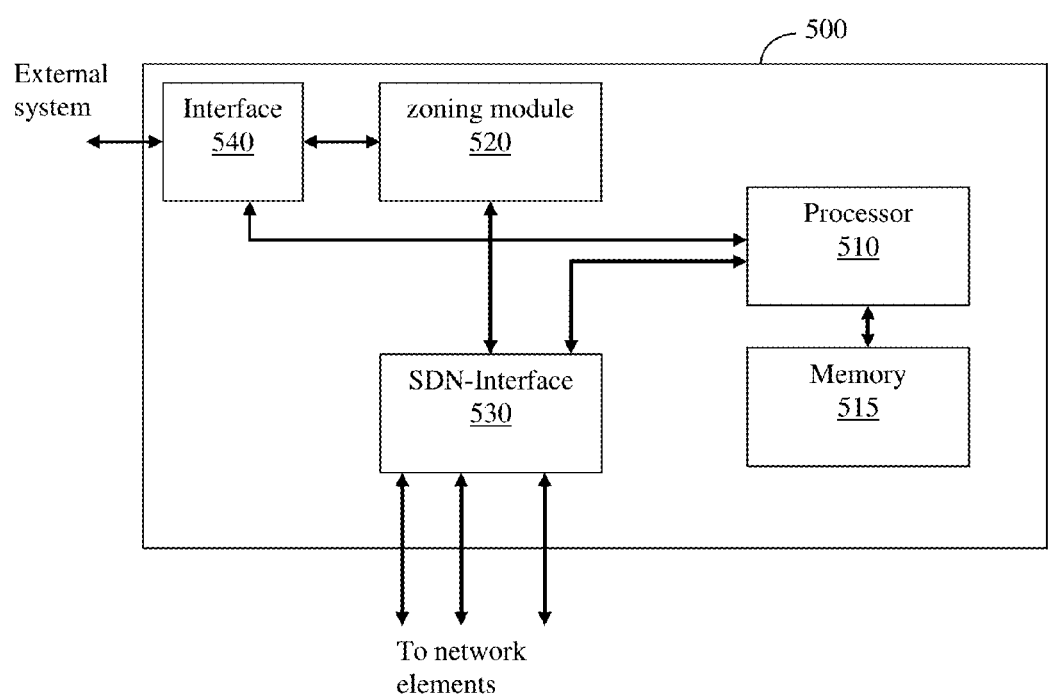
FIG. 5 shows an exemplary and non-limiting block diagram of the central controller constructed according to one embodiment.

FIG. 5 shows an exemplary and non-limiting block diagram of a central controller 500 constructed according to one embodiment. The central controller 500 is operable in SDNs and is at least configured to execute the zoning process described in greater detail above. The controller 500 includes a processor 510 coupled to a memory 515, a zoning diversion module 520, a SDN-interface module 530, and an interface 540 to an external system.

The SDN-interface module 530 allows the communication with the network elements of the SDN. In one embodiment, such communication uses the OpenFlow protocol through which a secure channel established with each network element. The interface 540 provides an interface to an external system, such as, but not limited to, an attack detection device, a security management system, and the like.

The zoning module 520 is configured to determine if a zoning mode should be applied. In addition, the zoning module 520 generates the zoning rules as defined in detail above. The module 520 communicates with the network elements through the SDN-interface 530. The processor 510 uses instructions stored in the memory 515 to execute tasks traditionally performed by the central controllers of SDN and optionally for execution of the tasks performed by the modules 520, 530 and 540. The controller 500 in another embodiment includes a combination of application specific integrated circuits and processors. In a further embodiment the controller 500 is distributed across several devices and processors.

The foregoing detailed description has set forth a few of the many forms that different embodiments of the invention can take. It is intended that the foregoing detailed description be understood as an illustration of selected forms that the invention can take and not as a limitation as to the definition of the invention.

Most preferably, the various embodiments discussed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A method for separation of traffic processing in a software defined network (SDN), wherein the method is performed by a central controller of the SDN, comprising:
identifying, based on at least one zoning trigger parameter, a potential cyber-attack;
upon identifying the potential cyber-attack, triggering a zoning mode for mitigating the potential cyber-attack;
upon triggering the zoning mode, dynamically allocating, based on a load profile, a first group of computing resources of a computing farm to a trusted zone and a second group of computing resources to an un-trusted zone;
assigning the computing resources in the first group with a first address and the computing resources in the second group with a second address, wherein only the second address is advertised; and
causing at least one network element in the SDN to divert incoming traffic to the first group and to the second group of computing resources based on a plurality of zoning rules implemented by the at least one network element, wherein the plurality of zoning rules are determined by the central controller and determine that the traffic from a known trusted client is directed to the first group of computing resources and the traffic from an un-trusted client is directed to the second group of computing resources, thereby providing guaranteed service-level agreement to trusted clients.

2. The method of claim 1, wherein the plurality of zoning rules defines at least a list of trusted clients, an action to be performed when the traffic is received from each trusted client, and an action to be performed when a traffic is sent back to each trusted client.

3. The method of claim 2, wherein the plurality of zoning rules further defines at least one action for handling traffic received from suspicious clients, wherein a client is suspicious if the client is not in the list of trusted clients.

4. The method of claim 3, wherein each trusted client in the list of trusted clients is identified by at least an IP address or a range of IP addresses.

5. The method of claim 4, wherein the plurality of zoning rules include:
matching a source address of the traffic received from a client against the IP addresses listed in the trusted list and changing the destination address of the traffic received from the client to designate the first address when a match exists;
matching a destination address of traffic directed to a client against the IP addresses listed in the trusted list and replacing the source address of the traffic directed to the client from the first address to the second address when a match exists; and
matching a destination address of traffic received from clients against the first address and dropping the traffic when a match exists.

6. The method of claim 1, wherein the trusted clients are determined based on a plurality of security risk indication parameters.

7. The method of claim 1, further comprising:
computing a threat level value for each client accessing the computing farm;
comparing the computed threat level value to a predefined threshold; and
determining a client to be a trusted client based on the comparing of the computed threat level value and the predefined threshold.

8. The method of claim 7, wherein computing the threat level value includes:
assigning a score to a plurality of security risk indication parameter, wherein the score determines how the risk indication parameters are applicable for the client; and
calculating the threat level value as a weighted average of scores assigned to the risk indication parameters.

9. The method of claim 1, wherein the computing resources are dynamically allocated to the first group.

10. The method of claim 1, wherein the computing resources are connected to an application delivery controller (ADC), wherein the traffic from a trusted client is directed to the first group of computing resources over a secured path established through the at least one network element and the ADC.

11. The method of claim 10, wherein the ADC is a virtual appliance that includes at least two virtual instances of ADCs, wherein the traffic to the first group of computing resources are directed through a first virtual instance and the traffic to the second group of computing resources are directed through a second virtual instance of the at least two virtual instances of the ADC, wherein each one of the at least two virtual instances is addressed by at least one of: a port number, a MAC address, and a VLAN ID, and an IP address.

12. The method of claim 1, wherein the traffic diversion is transparent to an application protocol utilized by the clients.

13. The method of claim 1, wherein triggering the zoning mode is performed based on a plurality zoning trigger parameters, wherein each of the plurality zoning trigger parameters indicating a potential risk that a cyber-attack is about to take place against the computing farm or that the computing farm is currently under a cyber-attack.

14. The method of claim 1, wherein the load profile includes load characteristics of client groups originating from different locations.

15. The method of claim 14, wherein the load characteristics are per any of: different times of the day, and different times of the week.

16. A non-transitory computer readable medium having stored thereon instructions that when executed causing a central controller of a software defined network (SDN) to perform a process for separation of traffic, the process comprising:
identifying, based on at least one zoning trigger parameter, a potential cyber-attack;
upon identifying the potential cyber-attack, triggering a zoning mode for mitigating the potential cyber-attack;
upon triggering the zoning mode, dynamically allocating, based on a load profile, a first group of computing resources of a computing farm to a trusted zone and a second group of computing resources to an un-trusted zone;
assigning the computing resources in the first group with a first address and the computing resources in the second group with a second address, wherein only the second address is advertised; and
causing at least one network element in the SDN to divert incoming traffic to the first group and to the second group of computing resources based on a plurality of zoning rules implemented by the at least one network element, wherein the plurality of zoning rules are determined by the central controller and determine that the traffic from a known trusted client is directed to the first group of computing resources and the traffic from an un-trusted client is directed to the second group of computing resources, thereby providing guaranteed service-level agreement to trusted clients.

17. A central controller for a software defined network (SDN), comprising:
a processing unit; and
a memory, the memory containing instructions that, when executed by the processing unit, configures the central controller to:
identify, based on at least one zoning trigger parameter, a potential cyber-attack;
upon identifying the potential cyber-attack, trigger a zoning mode for mitigating the potential cyber-attack;
upon triggering the zoning mode, dynamically allocate, based on a load profile, a first group of computing resources of a computing farm to a trusted zone and a second group of computing resources to an un-trusted zone;
assign the computing resources in the first group with a first address and the computing resources in the second group with a second address, wherein only the second address is advertised; and
cause at least one network element in the SDN to divert incoming traffic to the first group and to the second group of computing resources based on a plurality of zoning rules implemented by the at least one network element, wherein the plurality of zoning rules are determined by the central controller and determine that the traffic from a known trusted client is directed to the first group of computing resources and the traffic from an un-trusted client is directed to the second group of computing resources, thereby providing guaranteed service-level agreement to trusted clients.

18. The central controller of claim 17, wherein the load profile includes load characteristics of client groups originating from different locations.

19. The central controller of claim 18, wherein the load characteristics are per any of: different times of the day, and different times of the week.

* * * * *